United States Patent
Briesch et al.

[19]

[11] Patent Number: 5,845,481
[45] Date of Patent: Dec. 8, 1998

[54] COMBUSTION TURBINE WITH FUEL HEATING SYSTEM

[75] Inventors: Michael S. Briesch, Orlando; Jorge J. Alba, Winter Springs, both of Fla.

[73] Assignee: Westinghouse Electric Corporation, Pittsburgh, Pa.

[21] Appl. No.: 787,718

[22] Filed: Jan. 24, 1997

[51] Int. Cl.⁶ .................................................... F02C 7/224
[52] U.S. Cl. .............................................. 60/39.06; 60/736
[58] Field of Search ................................ 60/39.02, 39.06, 60/39.182, 736

[56] References Cited

U.S. PATENT DOCUMENTS

| | | | |
|---|---|---|---|
| 2,599,480 | 6/1952 | Pfenninger | 60/736 |
| 2,625,794 | 1/1953 | Williams et al. | 60/736 |
| 3,300,965 | 1/1967 | Sherlaw | 60/39.08 |
| 3,307,355 | 3/1967 | Bahr | 60/736 |
| 3,552,134 | 1/1971 | Arenson | 60/736 |
| 3,731,485 | 5/1973 | Rudolph et al. | 60/39.05 |
| 3,922,849 | 12/1975 | Kors et al. | 60/39.51 R |
| 4,099,374 | 7/1978 | Foster-Pegg | 60/39.12 |
| 4,567,857 | 2/1986 | Houseman et al. | 123/3 |
| 4,932,204 | 6/1990 | Pavel et al. | 60/39.02 |
| 5,255,505 | 10/1993 | Cloyd et al. | 60/39.07 |
| 5,357,746 | 10/1994 | Myers et al. | 60/39.182 |

FOREIGN PATENT DOCUMENTS

| | | | |
|---|---|---|---|
| 0634562 | 1/1995 | European Pat. Off. | 21/4 |
| 63085207 | 4/1988 | Japan . | |
| 9612091 | 4/1996 | WIPO | 21/4 |

*Primary Examiner*—Louis J. Casaregola
*Attorney, Agent, or Firm*—Daniel C. Abeles; Eckert Seamans Cherin & Mellott, LLC

[57] ABSTRACT

The combustion turbine system comprises a fuel line connected to the combustor with a portion of the fuel line being disposed in heat transfer relationship with the exhaust gas from the combustion turbine so that the fuel may be heated by the exhaust gas prior to being introduced into the combustor. The system may also comprise a fuel by-pass control system for mixing unheated fuel with the heated fuel to control the temperature of the fuel being introduced into the combustor.

26 Claims, 4 Drawing Sheets

COMBUSTION TURBINE WITH FUEL HEATING SYSTEM

BACKGROUND OF THE INVENTION

The invention relates to combustion turbine power plants and more particularly to fuel heating systems for combustion turbine power plants.

It is known in the art to indirectly utilize the exhaust gas from a combustion turbine to preheat combustion air and fuel in combustion turbine systems. In prior systems intermediate heat exchangers are utilized in which an intermediate fluid, such as, water is heated by the exhaust gas from the combustion turbine which in turn heats the fuel for combustion. This type of system can be more costly due to the additional heat exchanger and may not fully utilize the heat from the exhaust gas.

One prior art approach disclosed in U.S. Pat. No. 4,932,204 recovers heat available in the exhaust gas of the combustion turbine by increasing the water flow through the economizer section to a rate in excess of that required to match the steam production rate in the evaporator section. The excess water flow is withdrawn from the heat recovery steam generator at a temperature approaching the evaporator temperature and used to preheat the fuel delivered to the combustor of the combustion turbine.

Another approach proposed to preheat fuel is to use waste heat from the combustion turbine rotor air cooler to raise the fuel temperature to above 600° F. One draw back to using the rotor air cooler waste energy is that it requires a complex arrangement and sophisticated controls to maintain relatively constant fuel temperature while simultaneously maintaining the required cooling for the rotor over the possible range of operating loads for the turbine.

Therefore, what is needed is a combustion turbine fuel heating system that is simple, economical, will allow the fuel to be heated above 600° F., if desired, and can be used in a simple or combined cycle combustion turbine power plant.

SUMMARY OF THE INVENTION

The combustion turbine system comprises a fuel line connected to the combustor with a portion of the fuel line being disposed in heat transfer relationship with the exhaust gas from the combustion turbine so that the fuel may be heated by the exhaust gas prior to being introduced into the combustor. The system may also comprise a fuel by-pass control system for mixing unheated fuel with the heated fuel to control the temperature of the fuel being introduced into the combustor.

A portion of the fuel line may be disposed in the exhaust stack of the combustion turbine or it may be disposed in a separate flow path so that the amount of exhaust gas flowing in heat transfer relationship with the fuel line may be controlled or terminated. A portion of the fuel line may also be disposed in a section of a heat recovery steam generator or in a separate flow path connected to the heat recovery steam generator so that the amount of exhaust gas flowing in heat transfer relationship with the fuel line may be similarly controlled.

BRIEF DESCRIPTION OF THE DRAWINGS

The invention may be better understood when considered in view of the description of the preferred embodiment taken together with the following drawings wherein.

DESCRIPTION OF THE PREFERRED EMBODIMENT

Figure 1:
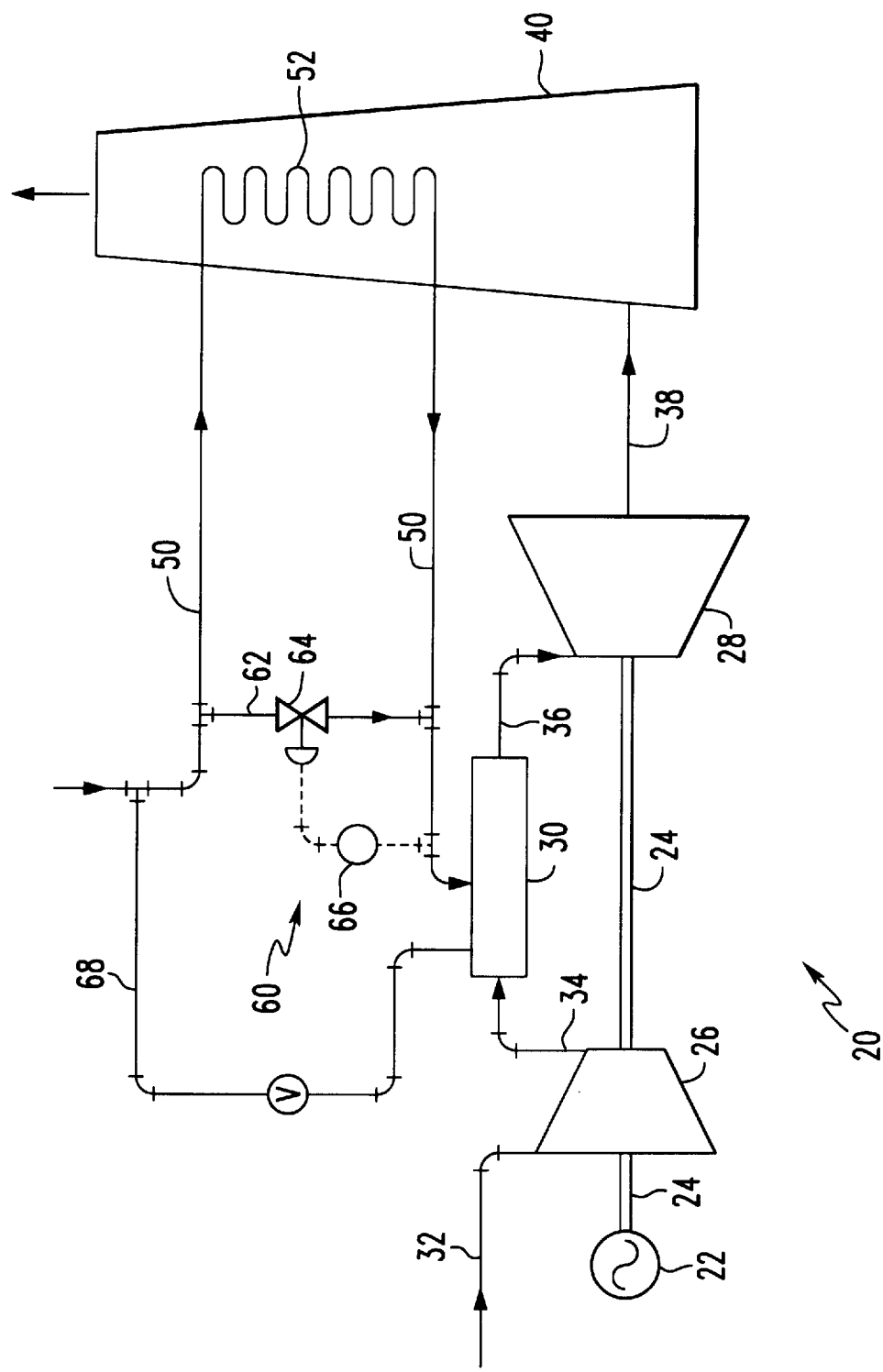
FIG. 1 is a schematic of the combustion turbine system with a portion of the fuel line disposed in the exhaust stack of the combustion turbine.

Referring to FIG. 1, the combustion turbine system comprises an electric generator 22 connected by rotor 24 to compressor 26 and combustion turbine 28 all in a manner well known in the art. A combustor 30 which may be chosen from those well known in the art is connected at one end to compressor 26 and at the other end to turbine 28.

An air intake line 32 is connected to compressor 26 for providing air to compressor 26. First pipe 34 connects compressor 26 to combustor 30 for directing the air compressed by compressor 26 into combustor 30. Combustor 30 combusts compressed air and fuel in a know manner to produce a hot compressed motive gas. The motive gas is conducted from combustor 30 by second pipe 36 to turbine 28 for driving turbine 28. Turbine 28 driven by the motive gas turns rotor 24 which drives compressor 26 and generator 22 thereby producing electricity in a manner well known in the art.

The discharge from turbine 28 is conducted by third pipe 38 to exhaust stack 40 from where the exhaust gas from turbine 28 is discharged to the atmosphere. Typically, the temperature of the exhaust gas in stack 40 exceeds 800° F. It is this waste heat which is desirable to utilize.

A fuel line 50 extends from a source of fuel, not shown, to combustor 30 for delivering fuel to combustor 30. Fuel line 50 may have a heat exchange portion 52 disposed in stack 40 in heat transfer relationship with the hot exhaust gas traveling through stack 40. Fuel line 50 may convey a liquid fuel or a gaseous fuel such as methane as is customary in combustion turbine systems. In practice, heating of liquid fuels may be limited to a low temperature, about 200° F., to prevent thermal decomposition of the fuel's constituents. Natural gas, however, may generally be heated up to 1000° F., depending on the fraction of higher hydrocarbons present in the gas in addition to methane, which is the primary component. The desired temperature for heating each fuel will depend on the fuel analysis. The temperature should be established to prevent excessive decomposition of the fuel's constituents that could lead to coking in the combustor or otherwise affect the combustion process.

To control the fuel delivery temperature, combustion turbine system 20 may also comprise a by-pass fuel control system 60. Control system 60 may comprise a by-pass fuel line 62 connected to fuel line 50 at a point upstream of heat exchange portion 52 and at another point downstream of heat exchange portion 52 thereby by-passing heat exchange portion 52 as shown in FIG. 1. Control system 60 may also comprise a by-pass flow control valve 64 disposed in by-pass fuel line 62 and a temperature controller 66 electrically connected to fuel line 50 near combustor 30 and electrically connected to control valve 64 for monitoring the temperature of the fuel entering combustor 30 and for varying the amount of unheated fuel passing through by-pass fuel line 62. This control function may also be accomplished within the combustion turbine control system.

Temperature controller 66 may be a Logix 2000 digital positioner from the Valtek Company, and control valve 64 may be a globe valve or ball valve supplied by the Fisher company. Fuel flowing through fuel line 50 from the fuel source is diverted through by-pass fuel line 62 thereby remaining unheated while the remainder flows through heat exchange portion 52 where it is heated. The unheated by-pass flow and the heated flow are then joined in fuel line 50 downstream of heat exchange portion 52 and flow into combustor 30. The mixing of the unheated and heated fuel in this manner thus lowers the temperature of the heated fuel to a desired level. If it is desired to increase the temperature of the fuel entering combustor 30, temperature controller 66 can be adjusted to a set point that causes control valve 64 to decrease the amount of unheated fuel passing through by-pass fuel line 62 and into fuel line 50 downstream of heat exchange portion 52 thereby increasing the temperature of the fuel entering combustor 30. Likewise, the flow through by-pass fuel line 62 can be increased by adjusting temperature controller 66 to a lower set point. In this manner the temperature of the fuel entering combustor 30 may be automatically controlled.

In a typical 150 MW turbine, fuel enters fuel line 50 from a fuel source at approximately ambient temperature with a portion flowing through by-pass fuel line 62 and the remainder through heat exchange portion 52. The temperature of the exhaust gas flowing through stack 40 at full load is about 1,100° F. With natural gas fuel flowing through heat exchange portion 52 at about 80,000 lb/hr, the fuel exits heat exchange portion 52 at about 600° F. to 750° F. Temperature controller 66 may be set to 600° F. In this case control valve 64 is automatically adjusted by temperature controller 66 such that a sufficient amount of unheated fuel which may be approximately 0 to 20,000 lb/hr flows through by-pass fuel line 62 and mixes with the heated fuel in fuel line 52 downstream of heat exchange portion 52 thereby reducing the temperature of the fuel in the line to about 600° F.

In another embodiment to the system, a direct fuel line 68 having a flow control value therein may be incorporated which extends from fuel line 50 to combustor 30. Direct fuel line 68 provides a means to supply unheated fuel directly to combustor 30. This arrangement would be desired when combustor 30 utilizes separately controlled combustion stages and one of the stages requires unheated fuel for proper operation. An example of this would be a dry low NOx combustor with a diffusing-flame pilot stage and one or more lean combustion stages. The design of the pilot stage may require that it be supplied with unheated fuel whereas the lean combustion stages may be optimized for burning heated fuel.

Combustion turbine system 20, therefore, provides a means be which the temperature of the fuel delivered to combustor 30 may be accurately and automatically controlled. Control of fuel temperature is particularly important in dry low NOx combustion turbines because the lean combustion stages of such a combustor may be optimized for fuel at a particular temperature and may not achieve the desired levels of emissions if the fuel is at a significantly different temperature.

Figure 2:
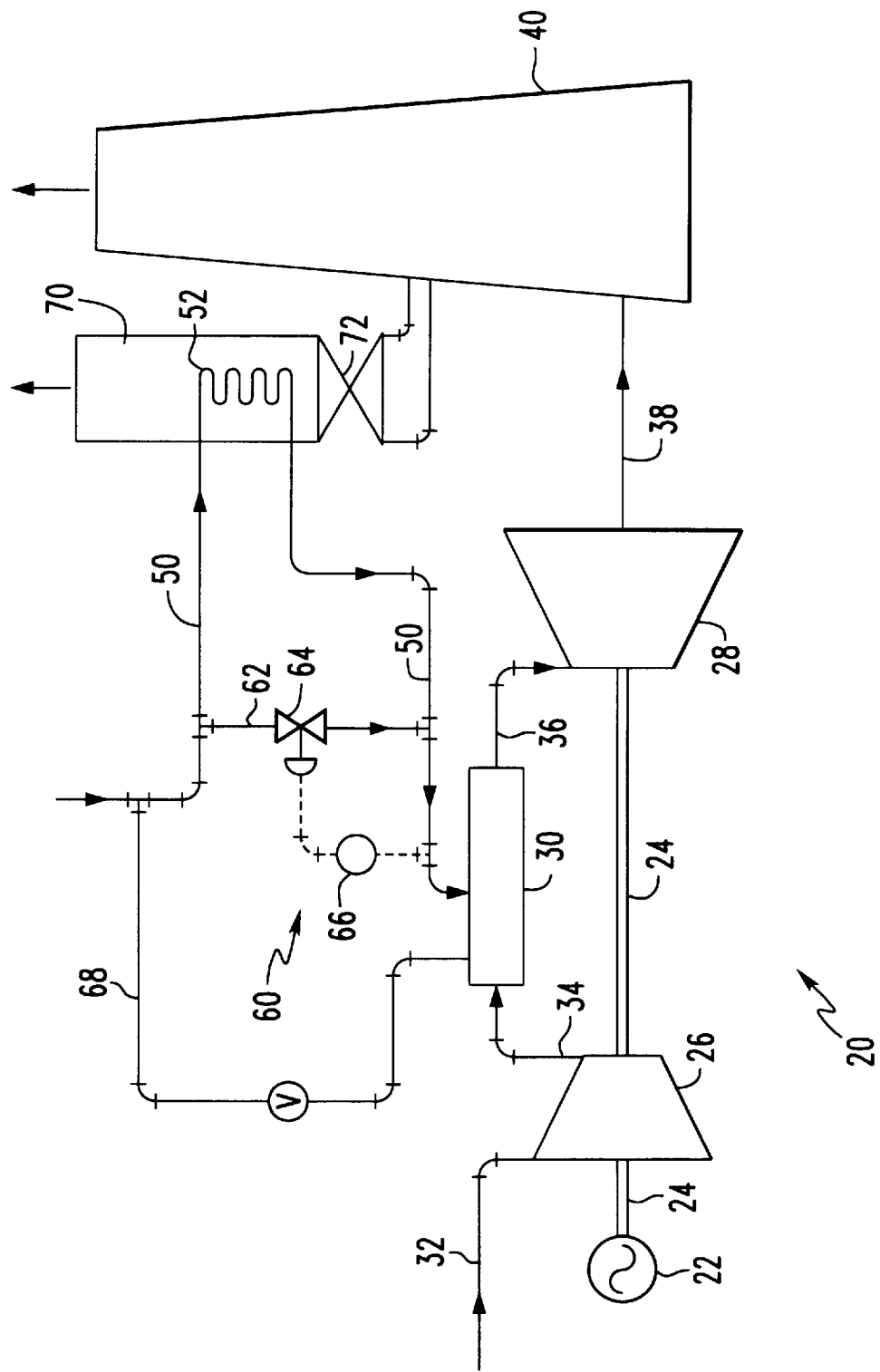
FIG. 2 is a schematic of the combustion turbine system with a portion of the fuel line disposed in a separate section of the exhaust stack of the combustion turbine.

Referring now to FIG. 2, as an alternative, stack 40 may have a by-pass channel 70 connected to it such that a portion of the exhaust gas flows through channel 70. Channel 70 may have a damper 72 disposed therein for controlling the amount of exhaust gas flowing through channel 70. In this alternative, heat exchange portion 52 of fuel line 50 may be disposed in channel 70 downstream of damper 72 such that the flow of exhaust gas in heat exchange relationship with heat exchange portion 52 may be controlled or eliminated by adjusting damper 72 either manually or automatically.

Figure 3:
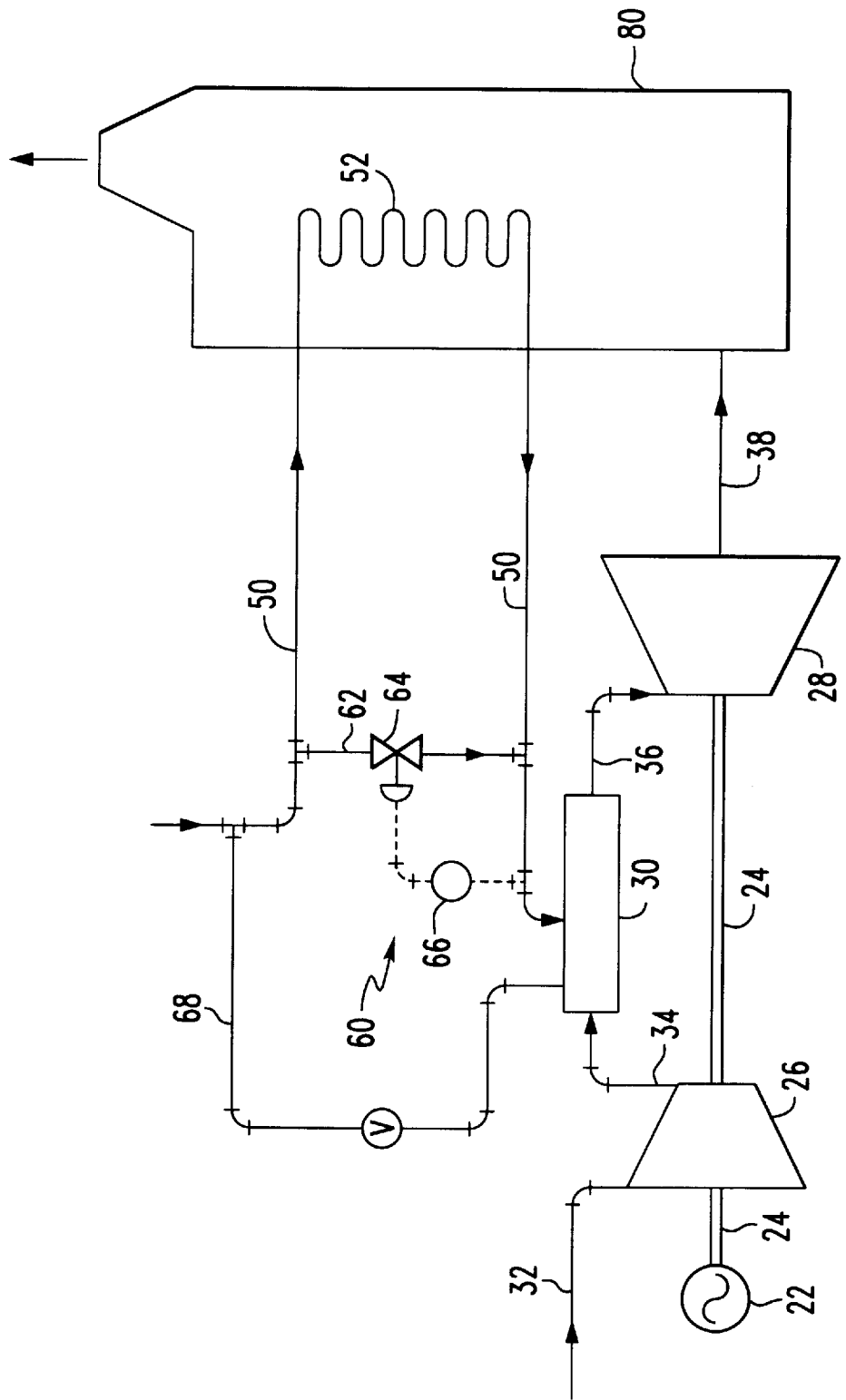
FIG. 3 is a schematic of the combustion turbine system with a portion of the fuel line disposed in the heat recovery steam generator.

FIG. 3 shows a variation of combustion turbine system 20 wherein heat exchange portion 52 is disposed in heat recovery steam generator 80. In this embodiment, the exhaust gas from turbine 28 flows through heat recovery steam generator 80 and in heat transfer relationship with heat exchange portion 52 disposed therein.

Figure 4:
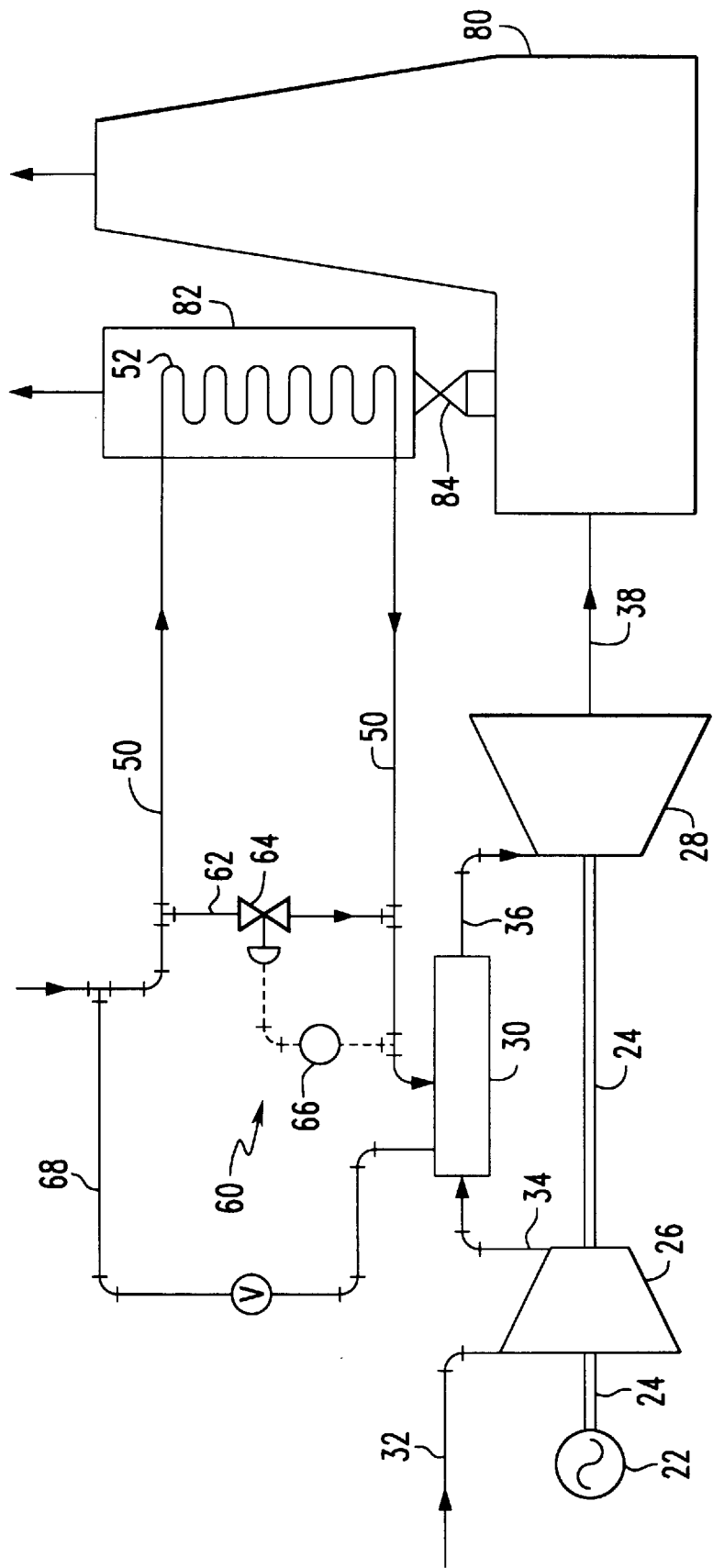
FIG. 4 is a schematic of the combustion turbine system with a portion of the fuel line disposed in a separate section of the heat recovery steam generator.

FIG. 4 discloses a variation of the embodiment shown in FIG. 3 wherein heat recovery steam generator 80 has a by-pass passage 82 through which a portion of the exhaust gas flows. Valve 84 is located between the main section of heat recovery steam generator and passage 82 to control the flow of exhaust gas through passage 82 and in heat transfer relationship with heat exchange portion 52 disposed in passage 82.

The invention may be embodied in other specific forms without departing from the spirit of the present invention.

Therefore, the invention provides a combustion turbine fuel heating system that is simple, economical, will allow the fuel to be heated above 600° F., if desired, and can be used in a simple or combined cycle combustion turbine power plant.

We claim as our invention:

1. A combustion turbine system comprising:
   a compressor for compressing air for combustion;
   a combustor connected to said compressor for receiving compressed air from said compressor and for receiving fuel with said compressed air and said fuel being combusted therein and producing a combustion gas;
   a turbine connected to said combustor and arranged to receive said combustion gas for driving said turbine with said combustion gas being exhausted from said turbine;
   a fuel line connected to a source of said fuel and connected to said combustor with a portion of said fuel line being disposed in heat transfer relationship with said combustion gas thereby heating said fuel prior to being introduced into said combustor; and
   a controller for controlling the amount of heat imparted by said combustion gas to the fuel prior to said fuel being introduced into said combustor to maintain at least a portion of said fuel at a substantially elevated preselected temperature relative to ambient conditions, within a given temperature range.

2. The combusting turbine system according to claim 1 wherein said preselected temperature is determined, from a constituent analysis of the fuel, to approach a temperature at which said fuel burns most completely substantially destroying undesirable byproducts while remaining below a temperature that would otherwise cause thermal decomposition of said fuel's constituents.

3. The combustion turbine system according to claim 2 wherein said portion of said fuel line is disposed in heat transfer relationship with said combustion gas downstream of said turbine.

4. The combustion turbine system according to claim 3 wherein said system further comprises an exhaust stack connected to said turbine for exhausting said combustion gas to the atmosphere.

5. The combustion turbine system according to claim 4 wherein said portion of said fuel line is disposed in heat transfer relationship with said combustion gas traversing said exhaust stack.

6. The combustion turbine system according to claim 1 wherein said system further includes a by-pass fuel system for directing unheated fuel to said combustor.

7. The combustion turbine system according to claim 6 wherein said by-pass fuel system comprises a by-pass fuel line connected to a source of said fuel and connected to said combustor for delivering unheated fuel to said combustor.

8. The combustion turbine system according to claim 7 wherein the controller comprises said by-pass fuel system further including control means connected to said fuel line for controlling the amount of said heated fuel and the amount of said unheated fuel being delivered to said combustor.

9. The combustion turbine system according to claim 8 wherein said control means comprises:

control valve means disposed in said by-pass fuel line for varying the amount of fuel passing therethrough; and temperature controller means electrically connected to said fuel line downstream of said by-pass fuel line and electrically connected to said control valve means for sensing the temperature of said fuel entering said combustor and for adjusting the flow of said unheated fuel in said by-pass fuel line.

10. The combustion turbine system according to claim 5 wherein said portion of said fuel line is disposed in a by-pass channel of said exhaust stack.

11. The combustion turbine system according to claim 10 wherein said by-pass channel has a damper disposed therein for controlling the flow of said combustion gas therethrough.

12. The combustion turbine system according to claim 9 wherein said control valve means comprises a globe valve.

13. The combustion turbine system according to claim 9 wherein said temperature controller means comprises a digital positioner.

14. The combustion turbine system according to claim 3 wherein said fuel is natural gas and said preselected temperature is in a range between 600°–750° F. (315°–400° C.).

15. The combustion turbine system according to claim 6 wherein said by-pass fuel system comprises a by-pass fuel line connected to a source of said fuel and connected to said combustor for delivering unheated fuel to said combustor.

16. The combustion turbine system according to claim 15 wherein said by-pass fuel system further comprises control means connected to said fuel line for controlling the amount of said heated fuel and the amount of said unheated fuel being delivered to said combustor.

17. The combustion turbine system according to claim 16 wherein said control means comprises:

control valve means disposed in said by-pass fuel line for varying the amount of fuel passing there-through; and temperature controller means electrically connected to said fuel line downstream of said by-pass fuel line and electrically connected to said control valve means for sensing the temperature of said fuel entering said combustor and for adjusting the flow of said unheated fuel in said by-pass fuel line.

18. The combustion turbine system according to claim 3 wherein said combustion turbine system further comprises a heat recovery steam generator located downstream of said turbine with said combustion gas flowing therethrough, and with said portion of said fuel line being disposed in heat transfer relationship with said combustion gas traversing said heat recovery steam generator.

19. The combustion turbine system according to claim 18 wherein said heat recovery steam generator includes a by-pass passage wherein said portion of said fuel line is disposed in the path of said combustion gas within said by-pass passage.

20. The combustion turbine system according to claim 19 wherein said heat recovery steam generator further comprises a valve disposed in said by-pass passage for controlling the flow of combustion gas there-through.

21. A method of operating a combustion turbine system comprising:

combusting air and fuel thereby generating a combustion gas;

directing said combustion gas through a turbine for driving said turbine;

exhausting said combustion gas from said turbine, and directing said combustion gas in heat transfer relationship with a portion of a fuel line thereby heating said fuel therein;

controlling the amount of heat imparted by said combustion gas to the fuel prior to said fuel being introduced into said combustor to maintain at least a portion of said fuel at a substantially elevated preselected temperature relative to ambient conditions, within a given temperature range; and conducting said heated fuel into said combustor.

22. The method according to claim 21 wherein said controlling step further comprises mixing unheated fuel with said heated fuel prior to introduction into said combustor.

23. The combustion turbine system according to claim 3 wherein said combustion turbine system further comprises a heat recovery steam generator located downstream of said turbine with said combustion gas flowing therethrough, and with said portion of said fuel line being disposed in said heat recovery steam generator and in heat transfer relationship with said combustion gas.

24. The combustion turbine system according to claim 3 wherein said fuel is a liquid and said preselected temperature is approximately 200° F. (93° C.).

25. The combustion turbine system according to claim 3 wherein said fuel is natural gas and said preselected temperature is approximately 1000° F. (540° C.).

26. The combustion turbine system according to claim 14 wherein said fuel in heat exchange relationship with said combustion gas flows at a rate approximating 80,000 lb./hr.

* * * * *

(12) EX PARTE REEXAMINATION CERTIFICATE (8277th)
United States Patent
Briesch et al.

(10) Number: US 5,845,481 C1
(45) Certificate Issued: May 31, 2011

(54) COMBUSTION TURBINE WITH FUEL HEATING SYSTEM

(75) Inventors: Michael S. Briesch, Orlando, FL (US); Jorge J. Alba, Winter Springs, FL (US)

(73) Assignee: Siemens Westinghouse Power Corporation, Orlando, FL (US)

Reexamination Request:
No. 90/007,359, Jan. 3, 2005

Reexamination Certificate for:
Patent No.: 5,845,481
Issued: Dec. 8, 1998
Appl. No.: 08/787,718
Filed: Jan. 24, 1997

(51) Int. Cl.
*F02C 7/224* (2006.01)

(52) U.S. Cl. .......................................... 60/776; 60/736
(58) Field of Classification Search .............. 60/39.01, 60/772, 780, 776, 736; 431/11, 2, 274, 161, 431/215, 216, 162, 278, 281; 110/238
See application file for complete search history.

(56) References Cited

U.S. PATENT DOCUMENTS

| | | | | |
|---|---|---|---|---|
| 3,552,134 A | * | 1/1971 | Arenson | 62/50.2 |
| 5,095,693 A | * | 3/1992 | Day | 60/775 |
| 5,233,823 A | * | 8/1993 | Day | 60/775 |
| 5,320,518 A | * | 6/1994 | Stilger et al. | 431/7 |
| 5,845,481 A | | 12/1998 | Briesch | |
| 5,888,060 A | | 3/1999 | Velke | |

FOREIGN PATENT DOCUMENTS

| | | |
|---|---|---|
| CA | 2152518 | 6/1995 |
| WO | PCT CA97/00015 | 1/1997 |

OTHER PUBLICATIONS

U.S. Appl. No. 8/634,043 filed Apr. 17, 1996, William H. Velke.
1995 Gas Combustion Test Results and Report by Combustion Research Industries.
1999 Letter of Technology Rejection by CGRI Canadian Gas Research Institute.
Definition of Designation "Appliance" by Webster's Dictionary.

* cited by examiner

*Primary Examiner*—Matthew C. Graham

(57) ABSTRACT

The combustion turbine system comprises a fuel line connected to the combustor with a portion of the fuel line being disposed in heat transfer relationship with the exhaust gas from the combustion turbine so that the fuel may be heated by the exhaust gas prior to being introduced into the combustor. The system may also comprise a fuel by-pass control system for mixing unheated fuel with the heated fuel to control the temperature of the fuel being introduced into the combustor.

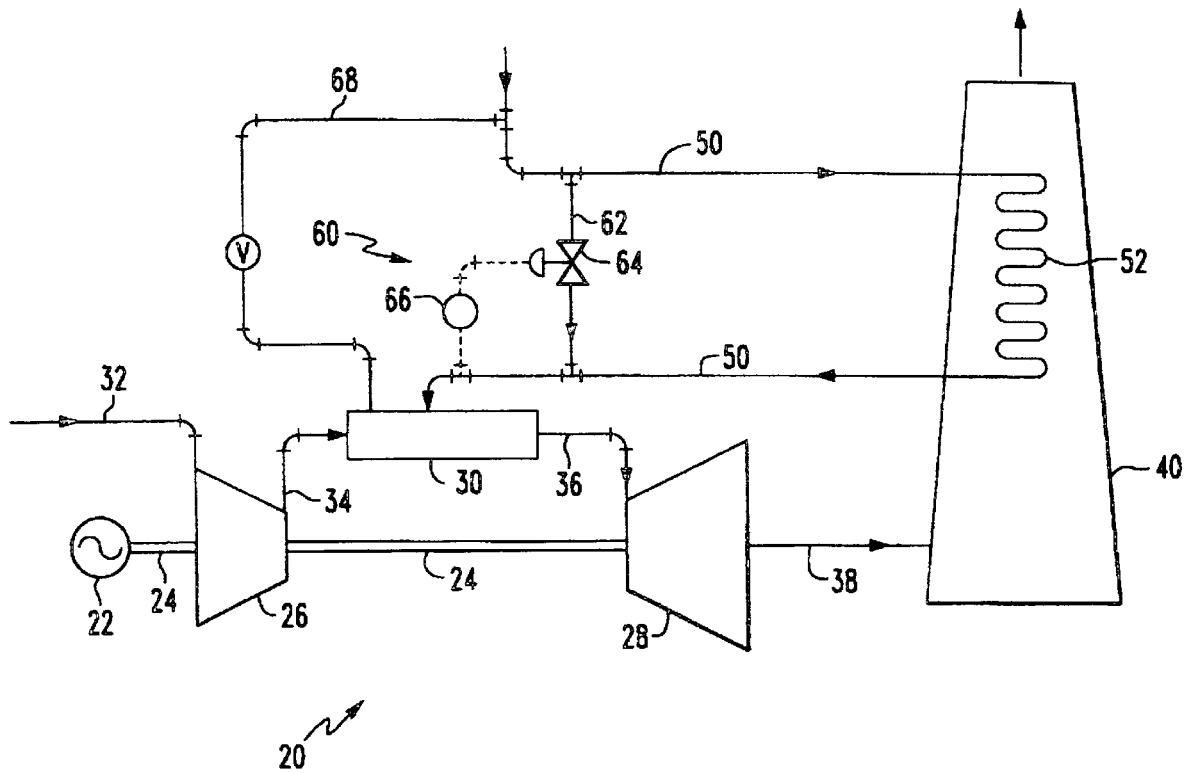

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 6-9, 12, 13, 15-17, 21 and 22 are cancelled.

Claim 2 is determined to be patentable as amended.

Claims 3-5, 10, 11, 14, 18-20 and 23-26, dependent on an amended claim, are determined to be patentable.

2. [The combusting turbine system according to claim 1] *A combustion turbine system comprising: a compressor for compressing air for combustion; a combustor connected to said compressor for receiving compressed air from said compressor and for receiving fuel with said compressed air and said fuel being combusted therein and producing a combustion gas; a turbine connected to said combustor and arranged to receive said combustion gas for driving said turbine with said combustion gas being exhausted from said turbine; a fuel line connected to a source of said fuel and connected to said combustor with a portion of said fuel line being disposed in heat transfer relationship with said combustion gas thereby heating said fuel prior to being introduced into said combustor; and a controller for controlling the amount of heat imparted by said combustion gas to the fuel to control the temperature of said fuel prior to said fuel being introduced into said combustor by producing a mixed fuel stream having a desired ratio of heated fuel to non-heated fuel, said ratio maintaining said temperature of said fuel wherein at least a portion of said fuel is maintained at a substantially elevated preselected temperature relative to ambient conditions, within a given temperature range, wherein said preselected temperature is determined, from a constituent analysis of the fuel, to approach a temperature at which said fuel burns most completely substantially destroying undesirable byproducts while remaining below a temperature that would otherwise cause thermal decomposition of said fuel's constituents.*

\* \* \* \* \*